United States Patent [19]

Baer

[11] 4,153,821
[45] May 8, 1979

[54] OPTICAL SCANNER MASKING MEANS

[75] Inventor: Ralph H. Baer, Manchester, N.H.

[73] Assignee: Marvin Glass & Associates, Chicago, Ill.

[21] Appl. No.: 745,216

[22] Filed: Nov. 26, 1976

[51] Int. Cl.² .................. G11B 17/06; G11B 21/10
[52] U.S. Cl. .................. 179/100.4 D; 179/100.3 V; 179/100.31; 250/237 R; 250/239; 250/570; 274/15 R
[58] Field of Search ............ 179/100.4 D, 100.41 L, 179/100.3 V, 100.3 E, 100.31; 250/239, 211 R, 216, 202, 566, 570, 237 R; 274/15 R, 9 RA

[56] References Cited

U.S. PATENT DOCUMENTS

| | | | |
|---|---|---|---|
| 2,007,370 | 7/1935 | Hopkins | 179/100.3 V |
| 2,654,810 | 10/1953 | Miessner | 179/100.3 V |
| 2,952,464 | 9/1960 | Stimler | 179/100.4 D |
| 3,368,080 | 2/1968 | Nakagiri et al. | 179/100.4 D |
| 3,937,903 | 2/1976 | Osann, Jr. | 179/100.4 D |
| 3,979,588 | 9/1976 | Park | 250/239 |

Primary Examiner—Raymond F. Cardillo, Jr.
Attorney, Agent, or Firm—Mason, Kolehmainen, Rathburn & Wyss

[57] ABSTRACT

The present invention is directed to an improvement in optical scanners particularly for use on programmable phonograph record players which provide certain automatic features, principally selection of predetermined sound track portions on a record. The invention includes the provision of a mask to improve the performance of an optical scanner having a light emitter and a photodetector mounted on the stylus end of the phonograph tone arm. The mask, such as an opaque coating or thin film sheet, is secured to the face of the optical scanner. The mask includes a pair of apertures which permit a predetermined amount of directed light energy from the light emitter to emanate toward the record surface and be reflected onto a portion of the photodetector to increase the accuracy and performance of the sensor in the recognition of very narrow intraband land areas and precise recognition of very short, or narrow, recorded sound track portions.

8 Claims, 7 Drawing Figures

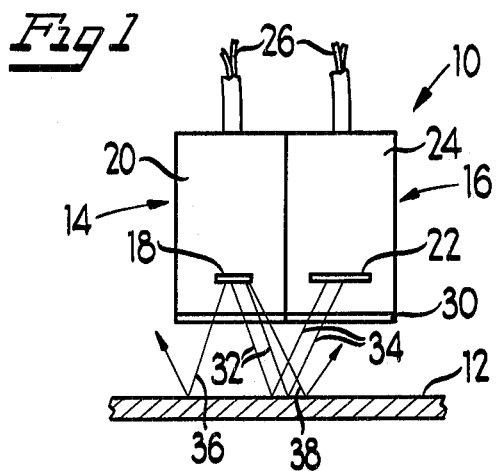
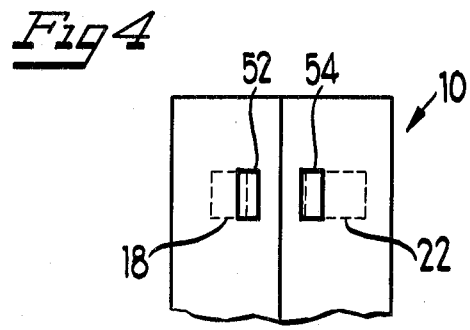
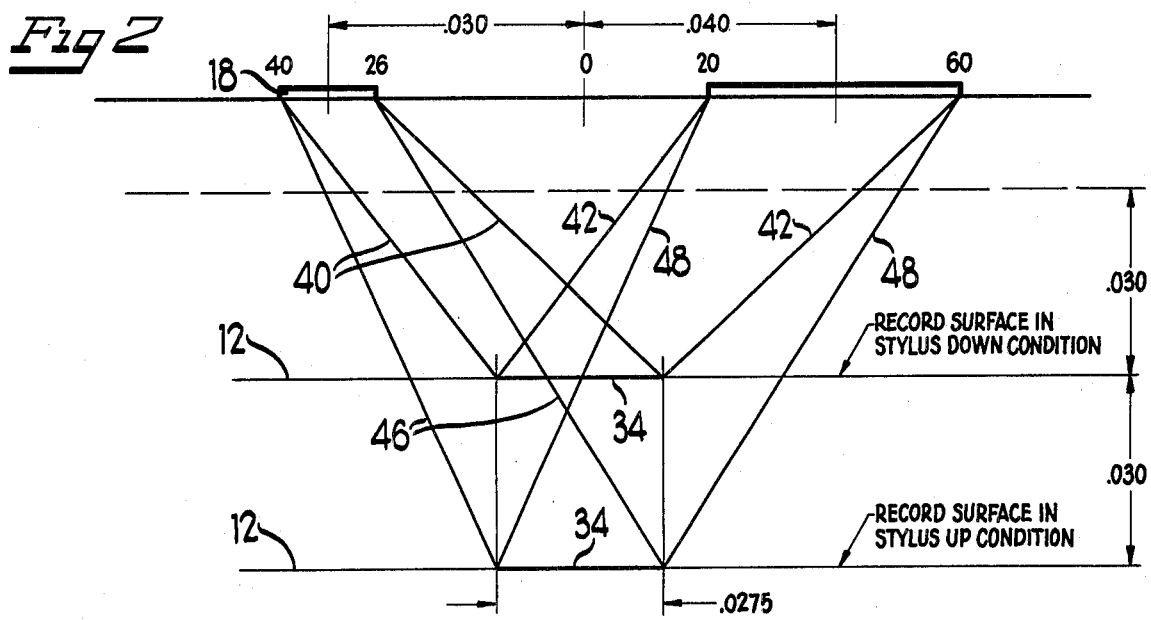
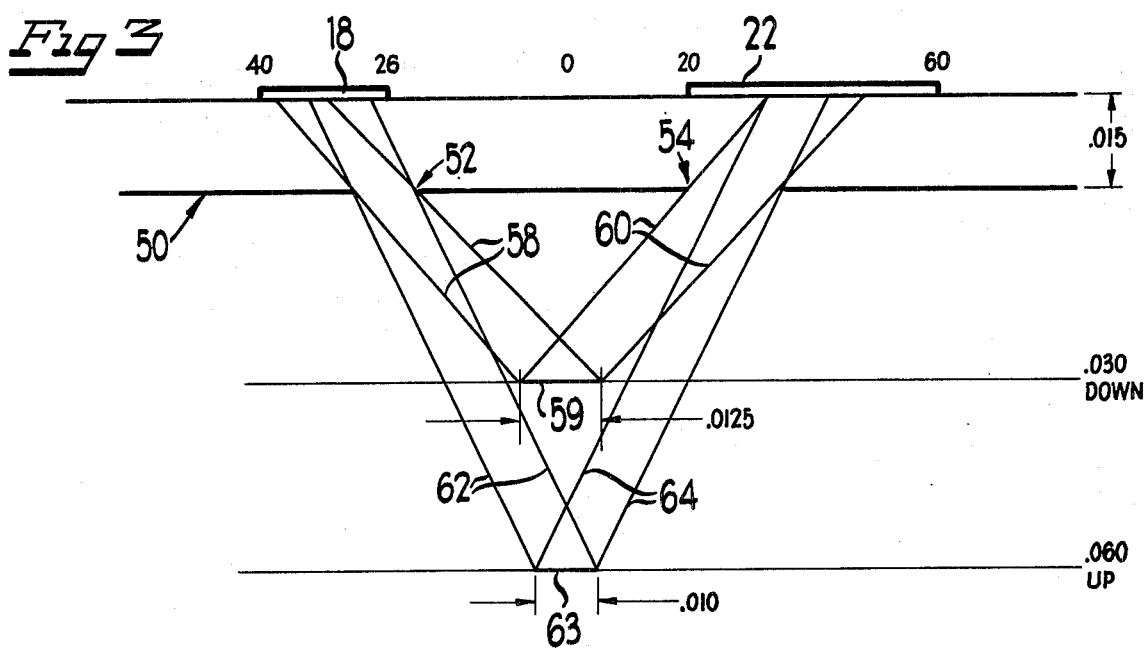

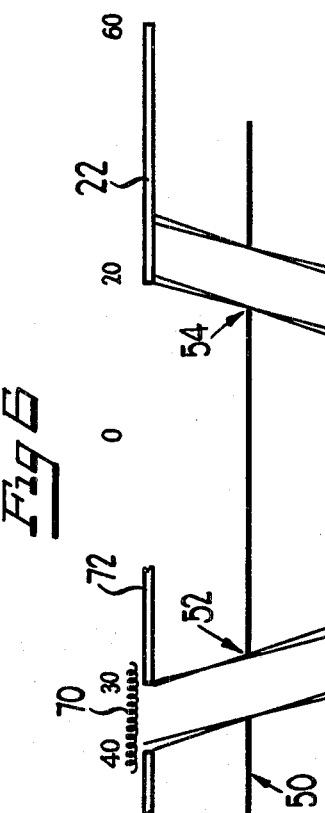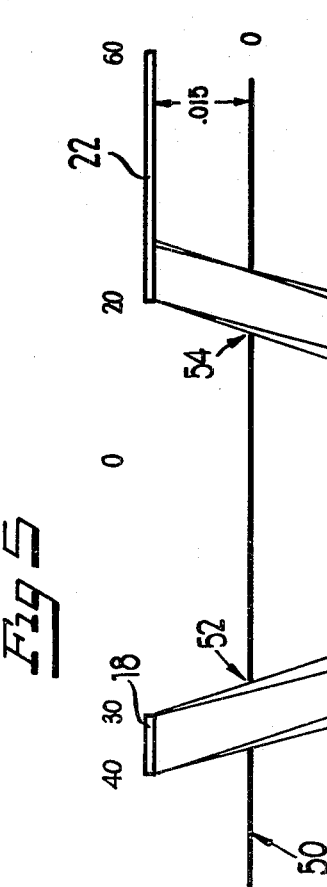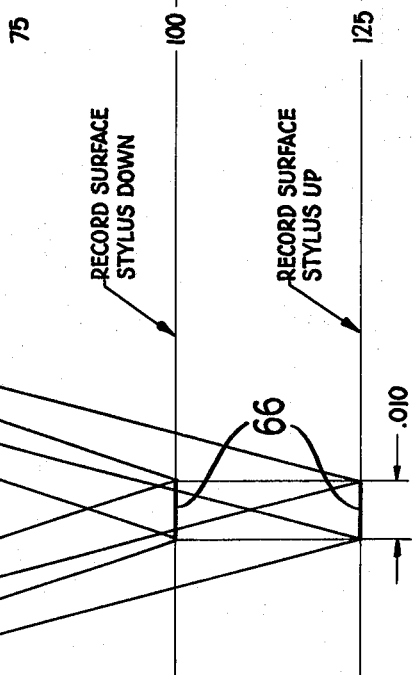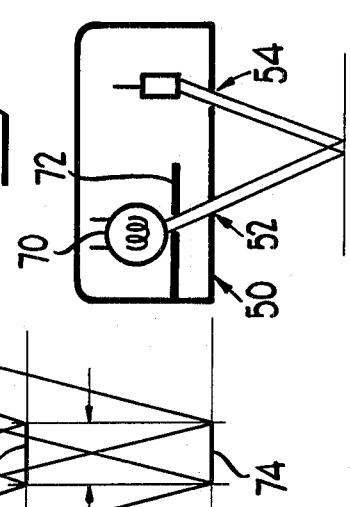

OPTICAL SCANNER MASKING MEANS

BACKGROUND OF THE INVENTION

1. Field of the Invention

The present invention provides an improved optical scanner for use on programmable phonograph record players such as that shown and described in copending patent applications Ser. No. 682,079, filed Apr. 30, 1976, and Ser. No. 705,138, filed July 14, 1976, which are assigned to the assignee of the present invention. In particular, the invention relates to a scanner masking system which increases the performance of the optical scanner.

2. Brief Description of the Prior Art

The above copending U.S. Patent Applications are incorporated herein by reference and show various phonograph devices which are designed to permit a user to select a certain number of sound tracks to be played from a particular record while skipping certain other sound tracks. In such programmable phonograph devices, an optical scanner assembly is provided to detect the presence of an approaching land area between modulated or recorded grooved sound track portions on a record. In order to provide accurate and reliable sensor readings, it is desirable that the light emitter be directed to a limited area on the record surface for reflection to the photodetector to increase performance in the recognition of very narrow land area widths and also very narrow modulated sound track portions.

SUMMARY OF THE INVENTION

An object of the present invention is to provide an improved optical scanner for use on programmable phonograph devices.

Another object of the present invention is to provide an optical scanner having increased performance and reliability in detecting very narrow land widths and, similarly, precise recognition of two land areas separated by a very short sound modulated band.

In accordance with the above objects, the present invention comprises an improvement in optical scanners particularly for use on programmable phonograph record players which provide several automatic features, principally selection of predetermined sound track portions on a record. The invention includes the provision of masking means to improve the performance of the optical scanner. The masking means includes a mask, such as an opaque coating or thin film sheet, secured to the face of the optical scanner. The mask includes a pair of apertures which permit a predetermined amount of directed light energy from the light emitter to emanate toward the record surface and be reflected onto a portion of the photodetector to increase the accuracy of the performance of the sensor in recognition of very narrow intraband land areas and precise recognition of very short, or narrow, recorded sound track portions.

Other objects, features and advantages of the invention will be apparent from the following detailed description taken in connection with the accompanying drawings.

BRIEF DESCRIPTION OF THE DRAWINGS

FIG. 1 is a front, somewhat schematic elevational view of an optical scanner mounted on the end of a phonograph tone arm;

FIG. 2 is a substantially enlarged view of the active elements of the scanner of FIG. 1 showing ray tracings of emitted light sensed by the photodetector;

FIG. 3 is another view, similar to FIG. 2, after the masking means of the present invention has been installed;

FIG. 4 is a bottom plan view of the face of the optical scanner showing the relative positions of the mask apertures and the light emitter and the photodetector;

FIG. 5 is an enlarged view similar to FIG. 3, showing the light ray tracings reflected from a record surface at a substantially greater distance than FIG. 3;

FIG. 6 is another enlarged view, similar to FIG. 5, wherein the light emitter is an incandescent light source; and FIG. 7 is a front elevational view, similar to FIG. 1, showing the mounting of the incandescent light source.

DESCRIPTION OF THE PREFERRED EMBODIMENT

Programmable phonograph devices which permit a user to select a number of sound track bands to be played from a record while skipping other sound track bands are shown in copending U.S. patent applications Ser. No. 682,079, filed Apr. 30, 1976, and 705,138 filed July 14, 1976, both of which are assigned to the assignee of the present invention. These applications are incorporated herein by reference. These programmable phonograph devices utilize an optical scanner, such as that shown and generally designated 10 in FIG. 1, for sensing the respective land areas between the modulated sound track portions of a record. The optical scanner 10 operates in a reflective mode and identifies the substantially high reflectivity of the intraband land areas between the various sound track portions of a record surface 12. The scanner element 10 includes a light emitter, generally designated 14, and a photodetector, generally designated 16. The light emitter 14 may be an infrared light emitting diode chip 18 encased within an epoxy or other suitable housing 20. Similarly, the photodetector may include a phototransistor chip 22 within a similar housing 24. Conventional leads 26 connect the light emitting diode 18 and the phototransistor 22 to the electronic control system. Typically, the active area of the light emitting diode chip is approximately 0.014 inches in width while the active area of the phototransistor chip is approximately 0.040 inches in width. The bottom of the sensor 10, referring to FIG. 1, includes a transparent face plate or shield 30 which permits light to emanate outwardly from the light emitting diode chip 18 and to be received by the phototransistor chip 22.

More particularly, referring to FIG. 1, some of the emanated light rays 32 from the light emitting diode 18 impinge the record surface 12 and are reflected back along lines 34 to the phototransistor 22. However, many other light rays 36 and 38 impinge the record surface and are reflected in a direction which does not impinge the phototransistor.

In operation, as described in the above mentioned applications and referring to FIG. 2, the scanner 10 provides its detecting function in two modes. In a first mode, the stylus "down" mode, the stylus is in engagement with the record surface, and the end of the face plate 30 of the scanner 10 is approximately 0.030 inches from the record surface. In another mode, the stylus "up" or "tone arm traverse" mode, the scanner operates and scans the record surface at a position approximately 0.060 inches above the record surface. The scanner must be operative in the stylus "down" mode to indicate when the end of a particular sound track is approaching, and must operate in the stylus "up" mode to indicate the beginning of an approaching modulated sound track portion which is to be reproduced.

In normal operation, referring to FIG. 2, a light ray tracing shows that the light emitting diode 18 produces an illuminated area on the record surface of approximately 0.0275 inches in width. The ray tracing shows that all beams projected over this area are specularly reflected and impinge the phototransistor 22 which is approximately 0.040 inches wide. In this figure, the centerlines of the light emitting diode 18 and phototransistor 22 are shown to be approximately 0.070 inches apart. In the stylus "down" position, the emitted light rays 40 impinge the record surface 12 and are reflected generally along lines 42 to the phototransistor 22. Similarly, in the stylus "up" position, the emitted light rays 46 impinge the record surface 12 and are reflected generally along lines 48 to the phototransistor. In both cases, the stylus "up" position and the stylus "down" position, the width of the illuminated area 34 is approximately 0.0275 inches.

Since the average groove to groove spacing on a modern high-fidelity phonograph record disc is approximately between 0.004 inches and 0.005 inches, this reflecting area of 0.0275 inches of width is equivalent to approximately six grooves. When a scanner 10 is used with these spatial characteristics, the scanner 10, through its associated land detection means, does not detect an extremely sharp transition as the illuminated area 34 gradually encounters an approaching, highly reflective intraband land area. It will take approximately eleven seconds for the illuminated area 34 to traverse or pass over a land area. If the land area is very narrow, for example, only 0.020 inches wide, there will be no sharp transition recognized by the scanner 10 since the beam is never fully reflected by the narrow land area and some part is always impinging the modulated recorded sound track portions on opposite sides of the narrow land area. Therefore, it is desirable to reduce the illuminated area 34 on the record surface to a width which would faithfully indicate the presence of land areas which may be as small as 0.020 inches in width.

A masking means, generally designated 50 (FIG. 3), is provided on the transparent surface 30 on the face of the phototransistor 22 and light emitting diode 18. This surface, and thus the mask 50, is spaced approximately 0.015 inches from the active areas of the light emitting diode chip 18 and phototransistor chip 22. The mask 50 is an opaque film such as a layer of black paint or a thin foil sheet which is applied directly to the transparent surface 30 and includes a pair of windows, generally designated 52 and 54. Referring to FIG. 4, each window is approximately 0.015 inches wide and 0.040 inches in length. This length also corresponds to the length of the light emitting diode chip 18 and the phototransistor chip 22. The windows 52 and 54 are positioned inwardly, toward one another, as shown in FIGS. 3 and 4, so that the centerline of the window 52 lies approximately on the inner end of the light emitting diode chip 18 and the window 54 has its inner end approximately coincident with the inwardmost edge of the phototransistor chip 22. The mask 50 will thus restrict the emergence of the light rays from the light emitting diode to only those which pass through the aperture 52. In the stylus down position, light rays 58 impinge the record surface illuminating an area 59 approximately 0.0125 inches in width which is reflected from the record surface through the aperture 54 and onto the phototransistor chip 22 along lines 60. Similarly, in the stylus up position, light emitted along lines 62 through the aperture 52, illuminate an area 63 of approximately 0.010 inches in width and are reflected along lines 64 through the aperture 54 to the phototransistor chip 22. The resultant effect is to reduce the illuminated area on the record surface, which is sensed by the phototransistor 22, to a maximum of 0.0125 inches in the stylus "down" position and a minimum of 0.010 inches in the stylus "up" position. Since the amount of reflected energy received by the phototransistor is obviously reduced by the masking means 50, the output of the phototransistor is compensated by an increased amplifier gain.

Therefore, in both the stylus "up" and stylus "down" positions the size of a intraband land area which can be recognized as such, has been reduced at least by a factor of two so that a very narrow land area, such as one which is 0.020 inches wide, can be properly recognized. Similarly, a very short recorded sound track portion, of approximately five or six grooves, can be recognized between two closely spaced intraband land areas.

In an alternate embodiment of the present invention shown in FIG. 5, the width of the illuminated area is maintained substantially constant between the stylus "up" and stylus "down" positions. Referring to FIG. 5, the scanner 10 is mounted on the tone arm so that the masking means 50 is supported above the record surface at a height of approximately 0.100 inches when in the stylus "down" position and at approximately 0.125 inches from the record surface in the stylus "up" position. In this embodiment, as shown by the ray tracings of FIG. 5, the width of the illuminated area 66 on the record surface, in either stylus position, is held constant at approximately 0.010 inches on the record surface. Since the amount of reflected light will thus be substantially the same for both the stylus "up" and the stylus "down" positions, there is no need to compensate in the output of the phototransistor for the two conditions.

Similarly, FIG. 6 shows another alternate embodiment in which the light emitting diode 18 is replaced by a relatively large filamentary or incandescent light source 70. In this embodiment, the mask aperture 52 must be filled with generally evenly distributed light from the incandescent light source 70. To provide the evenly distributed light rays, the incandescent light source 70 is masked by an additional internal mask or shield 72 which substantially eliminates any unevenly distributed light rays from the filament. FIG. 7 shows the alternate embodiment utilizing the incandescent light source, on a smaller scale. The internal shield 72 is generally in alignment with light rays emitted through the aperture 52 in the masking means 50 to provide an illuminated area 74, approximately 0.100 inches on the record surface. Again, referring to FIG. 6, the illuminated area is substantially the same width between the stylus "down" position at 0.10 inches and the stylus "up" position at 0.125 inches. Thus, if a visible cuing spot is desired on the record surface a suitable incandescent light source, such as a grain of wheat lamp, could be used.

The foregoing detailed description has been given for clearness of understanding only and no unnecessary limitations should be understood therefrom as some modifications will be obvious to those skilled in the art.

I claim:

1. A scanner for use in a phonograph device having a phonograph tone arm and a phonograph stylus for detecting the presence of an unrecorded land area on a record surface comprising:

a light emitting diode and a phototransistor mounted in a side by side arrangement on the end of the phonograph tone arm generally adjacent to the phonograph stylus and oriented to direct light from the light emitting diode to the record surface, the phototransistor being oriented to receive light from the light emitting diode reflected by the record surface; and masking means including a relatively thin opaque film applied to said light emitting diode and phototransistor having a first aperture between the light emitting diode and the record surface and a second aperture between the phototransistor and the record surface for illuminating a predetermined area on the record surface and reducing the amount of reflected light received by said phototransistor from the record surface.

2. The scanner of claim 1 wherein said first and second apertures are smaller than the respective light emitting diode and phototransistor.

3. The scanner of claim 2 wherein said apertures are positioned closer to one another than the distance between said light emitting diode and said phototransistor.

4. The scanner of claim 3 wherein the center line of said first aperture and the inner edge of said light emitting diode, and the inner edge of said second aperture and the inner edge of said photodetector are generally vertically aligned.

5. A scanner for use in a phonograph device having a phonograph tone arm and a phonograph stylus for detecting the presence of an unrecorded land area on a record surface comprising:

a light emitting diode and a phototransistor mounted on the end of the phonograph tone arm generally adjacent to the phonograph stylus and oriented to direct light from the light emitting diode to the record surface, the phototransistor being oriented to receive light from the light emitting diode reflected by the record surface; and masking means including a first aperture between the light emitting diode and the record surface and a second aperture between the phototransistor and the record surface for illuminating a reduced predetermined area on the record surface and reducing the amount of reflected light received by said phototransistor from the record surface wherein said light emitting diode and phototransistor each include an active element sealed within a housing having a transparent portion of predetermined dimensions between the light emitting diode and the record surface and between the phototransistor and the record surface defining a face surface, and said masking means includes an opaque film on said face, said film having voids defining said first and second apertures.

6. The scanner of claim 5 wherein said masking means is substantially closer to the light emitting diode and phototransistor than said record surface.

7. The scanner of claim 6 wherein the distance between the masking means and the record surface is approximately six times the distance between the masking means and said light emitting diode and phototransistor.

8. The scanner of claim 7 wherein said first and second apertures are generally rectangular measuring approximately 0.015 inches by 0.040 inches.

* * * * *